No. 636,254. Patented Nov. 7, 1899.
A. A. GAMBLE.
MECHANICAL MOVEMENT.
(Application filed Mar. 17, 1899.)
(Model.)
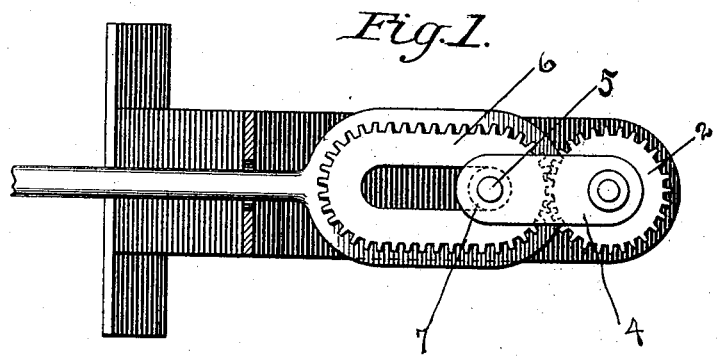
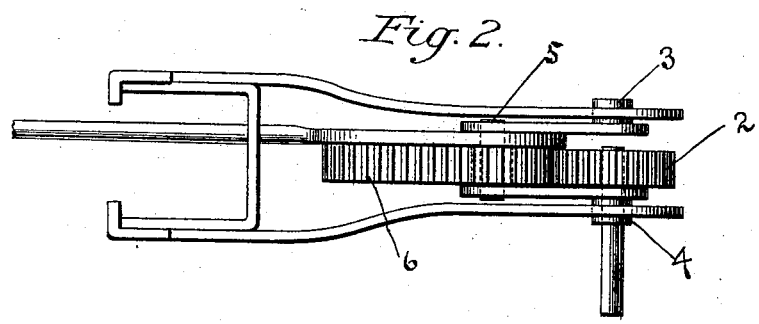
Witnesses:
H. M. Orton
L. D. Meredith
Inventor.
Alphonso A. Gamble

UNITED STATES PATENT OFFICE.

ALPHONSO A. GAMBLE, OF GRISWOLD, IOWA.

MECHANICAL MOVEMENT.

SPECIFICATION forming part of Letters Patent No. 636,254, dated November 7, 1899.

Application filed March 17, 1899. Serial No. 709,557. (Model.)

*To all whom it may concern:*

Be it known that I, ALPHONSO A. GAMBLE, a citizen of the United States, residing at the town of Griswold, in the county of Cass and State of Iowa, have invented certain new and useful Improvements in Mechanical Movements; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to a swinging link-arm; and the object of my invention is to hold firmly in mesh either round or oblong gears, so that I may obtain a longer stroke of a pitman on a short leverage, such as is used in lifting water by wind-power.

In the accompanying drawings, Figure 1 is a side view of the entire gear and link. Fig. 2 is a plan view of the same.

2 is a small spur-gear with shaft attached thereto.

3 is one part of the swinging link-arm. 4 is the other part of the swinging link-arm.

5 is the bolt or the journal that connects the link.

6 is the oblong gear.

7 is a sleeve and should be placed in the slot of the oblong gear 6, and the bolt or shaft 5 placed through the hole in the sleeve 7, and thus connecting to the lower end of the swinging link-arms. This forms the entire link, as shown in Fig. 2.

2 is a common spur-gear with a shaft thereto attached, which shaft should be placed through the hole in swinging link-arm 4, which forms a part of the box. This brings the teeth or cogs 2 and 6 in contact with each other. When the small gear 2 is turned around, it causes the oblong gear 6 to pass clear around the small gear 2, and by this mechanism I can obtain any length of a pitman-stroke that I may desire on a very short leverage.

I claim as my invention—

Swinging link-arms, boxes, and a journal attached to the inner ends of the same, a bolt connecting the swinging link-arms at their other ends, an oblong gear with a slot in the center, said bolt passing through the slot and through the holes in the outer ends of the swinging link-arms and connecting them together, and a spur-gear attached to a shaft which passes through one of the boxes at the inner ends of the swinging link-arms, substantially as described.

ALPHONSO A. GAMBLE.

Witnesses:
H. M. ORTON,
J. I. MEREDITH.